(12) United States Patent
Huprikar (10) Patent No.: US 7,281,705 B2
(45) Date of Patent: Oct. 16, 2007

(54) JOUNCE ASSEMBLY FOR A SUSPENSION SYSTEM

(75) Inventor: Anand Huprikar, Novi, MI (US)

(73) Assignee: BASF Corporation, Florham Park, NJ (US)

( * ) Notice: Subject to any disclaimer, the term of this patent is extended or adjusted under 35 U.S.C. 154(b) by 88 days.

(21) Appl. No.: 11/187,125

(22) Filed: Jul. 22, 2005

(65) Prior Publication Data

US 2007/0017761 A1   Jan. 25, 2007

(51) Int. Cl.
 *B60G 13/00* (2006.01)
(52) U.S. Cl. ............. 267/220; 267/293; 188/321.11
(58) Field of Classification Search ......... 267/220, 267/219, 221, 293; 188/322.16, 321.11
 See application file for complete search history.

(56) References Cited

U.S. PATENT DOCUMENTS

| | | |
|---|---|---|
| 2,720,374 A | 10/1955 | Hutton |
| 3,128,999 A | 4/1964 | Schmitt |
| 3,350,042 A | 10/1967 | Stewart et al. |
| 3,479,081 A | 11/1969 | Schaaf |
| 3,532,319 A | 10/1970 | Brown |
| 3,622,194 A | 11/1971 | Bryk |
| 3,809,427 A | 5/1974 | Bennett |
| 4,218,599 A | 8/1980 | Garn |
| 4,298,193 A | 11/1981 | Mourray |
| 4,306,708 A | 12/1981 | Gassaway et al. |
| 4,462,608 A | 7/1984 | Lederman |
| 4,521,004 A | 6/1985 | Caldwell |
| 4,530,491 A | 7/1985 | Bucksbee et al. |
| 4,720,075 A | 1/1988 | Peterson et al. |
| 4,720,086 A | 1/1988 | Le Salver et al. |
| 4,756,516 A | 7/1988 | Tondato |
| 4,771,996 A * | 9/1988 | Martinez et al. ............ 267/220 |
| 4,783,039 A | 11/1988 | Peterson et al. |
| 4,804,169 A | 2/1989 | Hassan |
| 4,805,886 A | 2/1989 | Hassan |
| 4,867,461 A | 9/1989 | Shimmell |
| 4,962,916 A | 10/1990 | Palinkas |
| 5,000,429 A | 3/1991 | Wittmar et al. |
| 5,158,269 A | 10/1992 | Hein et al. |
| 5,172,999 A | 12/1992 | Ijima et al. |
| 5,178,433 A | 1/1993 | Wagner |
| 5,295,671 A | 3/1994 | Nakagaki et al. |
| 5,308,104 A * | 5/1994 | Charles ............... 280/124.155 |
| 5,328,141 A | 7/1994 | Dickinson |
| 5,388,884 A | 2/1995 | Keehner et al. |
| 5,409,283 A | 4/1995 | Ban |
| 5,421,565 A | 6/1995 | Harkrader et al. |

(Continued)

*Primary Examiner*—Melanie Torres
(74) *Attorney, Agent, or Firm*—Fernando A. Borrego (57) ABSTRACT

A suspension system for a vehicle having a vehicle body and a plurality of wheels movable relative to the vehicle body. A hydraulic damper, which includes a piston rod and a cylinder, is disposed between the vehicle body and wheels. A striker plate is mounted to the cylinder and is displaceable with the cylinder relative to a support on the vehicle body. A jounce assembly is mounted to the support about the piston rod and extends outwardly toward the striker plate. The jounce assembly includes a jounce bumper and a cap. The cap is mounted to the jounce bumper with the cap having a flange extending to a distal edge for defining a cavity. The distal edge of the flange deflects into the cavity when the cap engages the striker plate during a predetermined displacement of the striker plate relative to the support.

24 Claims, 5 Drawing Sheets

U.S. PATENT DOCUMENTS

| | | |
|---|---|---|
| 5,467,970 A | 11/1995 | Ratu et al. |
| 5,487,535 A | 1/1996 | Carter et al. |
| 5,516,176 A | 5/1996 | Kimoto et al. |
| 5,788,262 A * | 8/1998 | Dazy et al. ............ 280/124.155 |
| 5,799,930 A | 9/1998 | Willett |
| 5,820,115 A | 10/1998 | Stevenson et al. |
| 5,915,775 A | 6/1999 | Martin et al. |
| 5,951,033 A | 9/1999 | Winter et al. |
| 5,979,884 A | 11/1999 | Sato et al. |
| 6,113,084 A | 9/2000 | Norkus et al. |
| 6,138,980 A | 10/2000 | Farbotnik |
| 6,155,544 A | 12/2000 | Solomond et al. |
| 6,170,812 B1 | 1/2001 | Nicoles |
| 6,186,486 B1 | 2/2001 | Gutman et al. |
| 6,199,844 B1 | 3/2001 | McCormick et al. |
| 6,254,072 B1 | 7/2001 | Bono et al. |
| 6,276,674 B1 | 8/2001 | Randell |
| 6,296,237 B1 | 10/2001 | Nagai |
| 6,364,296 B1 | 4/2002 | Cummings et al. |
| 6,412,798 B2 | 7/2002 | De Fontenay et al. |
| 6,416,102 B1 | 7/2002 | Howard |
| 6,427,989 B1 | 8/2002 | Hashimoto et al. |
| 6,435,584 B1 | 8/2002 | Bonnville |
| 6,471,179 B1 | 10/2002 | Tousi et al. |
| 6,485,008 B1 | 11/2002 | Griffin |
| 6,508,342 B2 * | 1/2003 | Pape et al. ............. 188/322.17 |
| 2001/0015537 A1 | 8/2001 | De Fontenay et al. |
| 2002/0121793 A1 | 9/2002 | Rice |
| 2003/0132561 A1 | 7/2003 | Burlage et al. |
| 2004/0075204 A1 | 4/2004 | Heidemann et al. |

\* cited by examiner

JOUNCE ASSEMBLY FOR A SUSPENSION SYSTEM

BACKGROUND OF THE INVENTION

1. Field of the Invention

The subject invention relates to a jounce assembly for a suspension system of a vehicle.

2. Description of Related Art

Vehicular suspensions systems typically include hydraulic dampers, including shock absorbers and struts, in combination with coil springs to absorb relative displacement between a wheel assembly or vehicle chassis and a vehicle body. The suspension systems also typically include a jounce bumper to isolate predetermined forces and to prevent metal-to-metal contact during the operation of the hydraulic damper. The jounce bumper typically becomes operable at or near a maximum compressive stroke of the suspension system. Although the jounce bumper must be able to isolate significant forces of the suspension system, it is also preferred that the jounce bumper include a configuration for receiving these forces in a relatively smooth manner. Many of the jounce bumpers are elongated, generally cylindrical members of a compressible material. Often the jounce bumpers are convoluted in shape and function by a progressive stacking of the convolutions to provide the required isolation of these forces.

Figure 1:
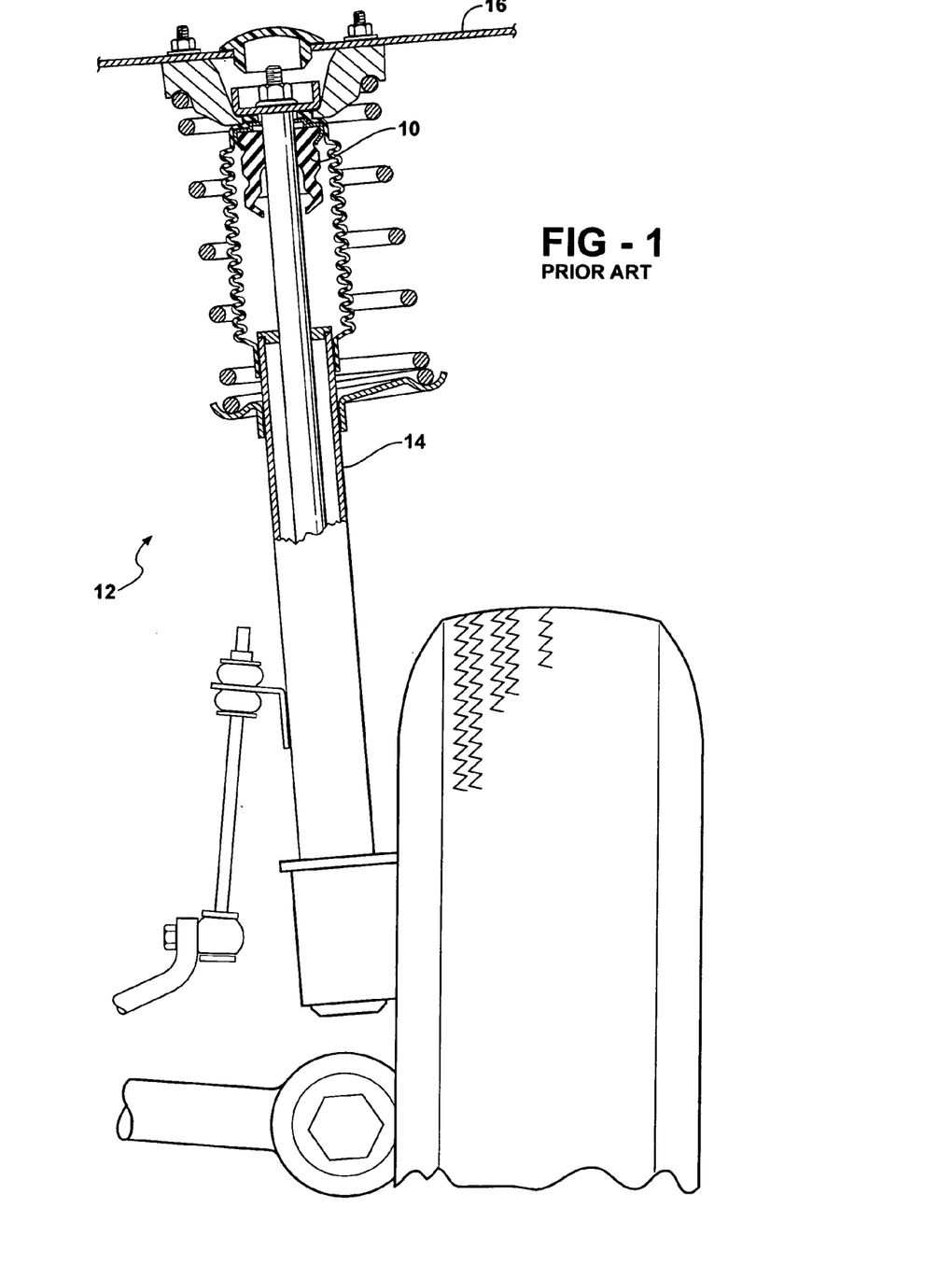
FIG. 1 is a partially cross-sectional front view of a prior art suspension system.

Once such jounce bumper is shown at 10 in FIG. 1. The jounce bumper 10 of FIG. 1 is part of a suspension system 12 utilizing a hydraulic damper 14. The jounce bumper 10 has a series of convolutions and extends from a relatively thick portion mounted to a vehicle body 16 to a relatively thin and flexible distal end. The convolutions and change in thickness provides a smooth isolation of forces as the hydraulic damper 14 engages the jounce bumper 10 and moves through a compressive stroke. The type of jounce bumper 10 shown in FIG. 1, however, can be difficult and expensive to manufacture, especially if the jounce bumper 10 is formed of a urethane material. Also, over time, the jounce bumper 10 can be cut or torn by repeated engagement with the hydraulic damper 14.

Accordingly, it would be desirable to develop a jounce assembly that can isolate the forces from the damper in a smooth manner, is less expensive, is easier to manufacture, and is less likely to cut or tear over time.

SUMMARY OF THE INVENTION AND ADVANTAGES

A suspension system for a vehicle having a vehicle body and a movable component displaceable relative to the vehicle body along a line of travel. The system comprises a support adapted to be mounted to the vehicle body. A striker surface is adapted to be mounted to the movable component and is displaceable relative to the support along the line of travel. A jounce bumper is mounted to the support and extends outwardly toward the striker surface. A cap is mounted to one of the jounce bumper and the striker surface with the cap having a flange extending to a distal edge for defining a cavity whereby the distal edge of the flange deflects into the cavity when the cap engages one of the striker surface and the jounce bumper during a predetermined displacement of the striker surface relative to the support. The jounce bumper and cap can be characterized as a jounce assembly for use in the suspension system The suspension system could be utilized to absorb displacement of a plurality of wheels relative to the vehicle body. In this environment, the suspension system would include a piston rod mounted to the support and a cylinder adapted to be mounted to each of the wheels. The piston rod extends into the cylinder and the cylinder moves relative to the piston rod and the support along a line of travel. A striker plate is mounted to the cylinder about the piston rod and is displaceable relative to the support during the movement of the cylinder along the line of travel. The jounce assembly is mounted to the support about the piston rod and extends outwardly toward the striker plate. The jounce assembly includes the jounce bumper and the cap.

Accordingly, the subject invention provides a two-piece jounce assembly having a jounce bumper and a cap. The cap operates to provide the desired smooth isolation of forces such that the jounce bumper can have a simplified configuration. The cap can be mounted to the jounce bumper or alternatively to the striker surface, which increases the versatility of the design. The cap also protects the less durable jounce bumper from excessive wear and subsequent cutting or tearing.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 2:
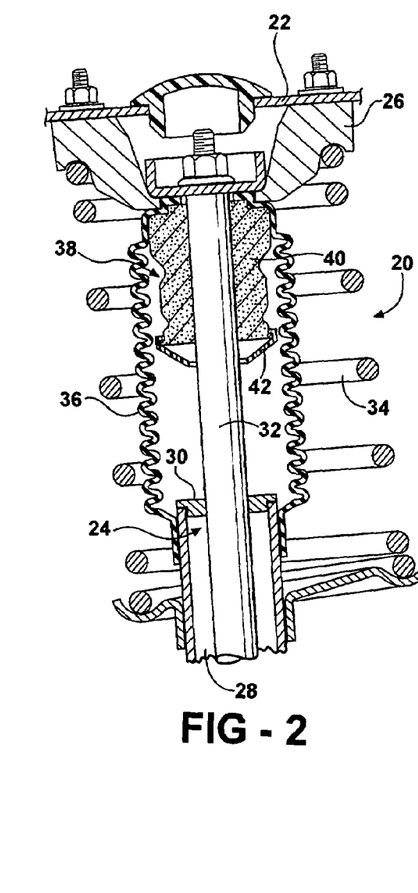
FIG. 2 is a partially cross-sectional front view of a suspension system in accordance with the subject invention in a non-actuated state.
Figure 3:
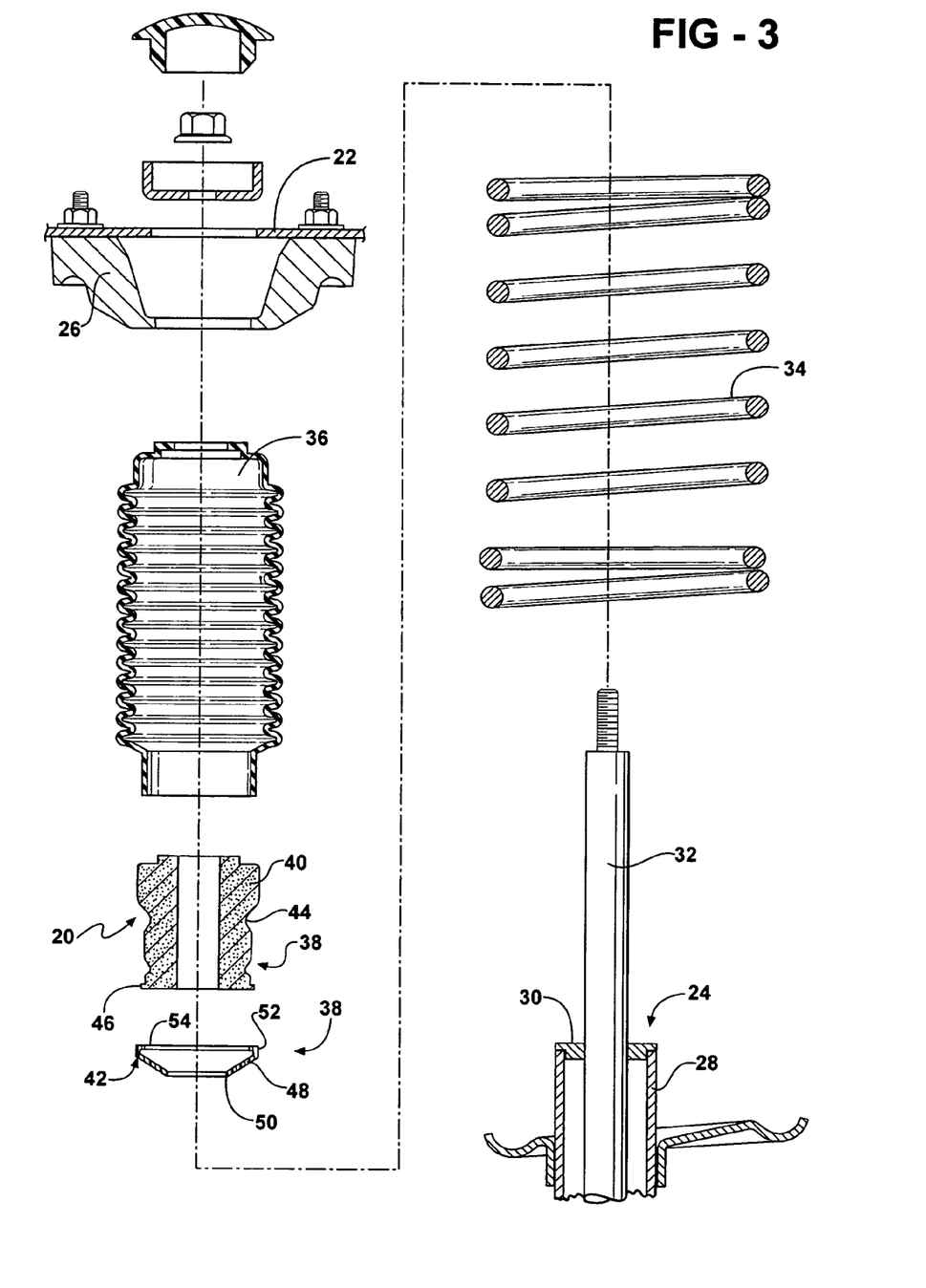
FIG. 3 is a partially cross-sectional exploded view of the suspension system of the subject invention.

Referring to the Figures, wherein like numerals indicate like or corresponding parts throughout the several views, one embodiment of a suspension system for a vehicle is generally shown at 20 in FIGS. 2 and 3. The vehicle includes a vehicle body 22 and a plurality of vehicle wheels displaceable relative to the vehicle body 22. In this embodiment, the suspension system 20 includes a hydraulic damper 24 connected between the vehicle body 22 and the vehicle wheels as is known in the art. The suspension system 20 includes a support 26 mounted to the vehicle body 22 and a movable component 28 displaceable relative to the vehicle body 22 along a line of travel. A striker surface 30 is associated with the movable component 28 and displaceable relative to said support 26 along the line of travel. The hydraulic damper 24 includes a piston rod 32 mounted to the support 26 at one end and includes the movable component 28. In this embodiment, the movable component 28 is illustrated as a cylinder 28 of the hydraulic damper 24 and the striker surface 30 is shown as a striker plate 30. An opposing end of the piston rod 32 extends into the cylinder 28.

During operation of the suspension system 20, the cylinder 28 moves relative to the piston rod 32 and the support 26 along a line of travel as is known in the art. The striker plate 30, which is mounted to the cylinder 28 (movable component), is disposed about the piston rod 32 and is displaceable with the cylinder 28 relative to the support 26 along the line of travel. This type of suspension system 20 is well known and includes a variety of other components such as a coil spring 34 and an elastic boot 36. As will become apparent from the subsequent discussion of the alternative embodiments, the subject invention may be implemented into a variety of different suspension systems, some examples of which are illustrated herein.

Referring to FIGS. 2-5, a jounce assembly 38 is mounted to the support 26 about the piston rod 32. In the embodiment of FIGS. 2 and 3, the jounce assembly 38 extends outwardly toward the striker plate 30. The jounce assembly 38 is formed of two components, which include a jounce bumper 40 and a cap 42. The jounce assembly 38 is formed of an elastomeric material for isolating the forces during operation of the suspensions system 20. Preferably, the jounce bumper 40 and cap 42 are formed of different elastomeric materials, which increases the tunability of the invention while maintaining adequate performance. Even more preferably, the jounce bumper 40 and cap 42 are formed of difference urethanes. In the most preferred embodiment, the jounce bumper 40 is formed of micro-cellular polyurethane and the cap 42 is formed of thermo plastic polyurethane.

Figure 4:
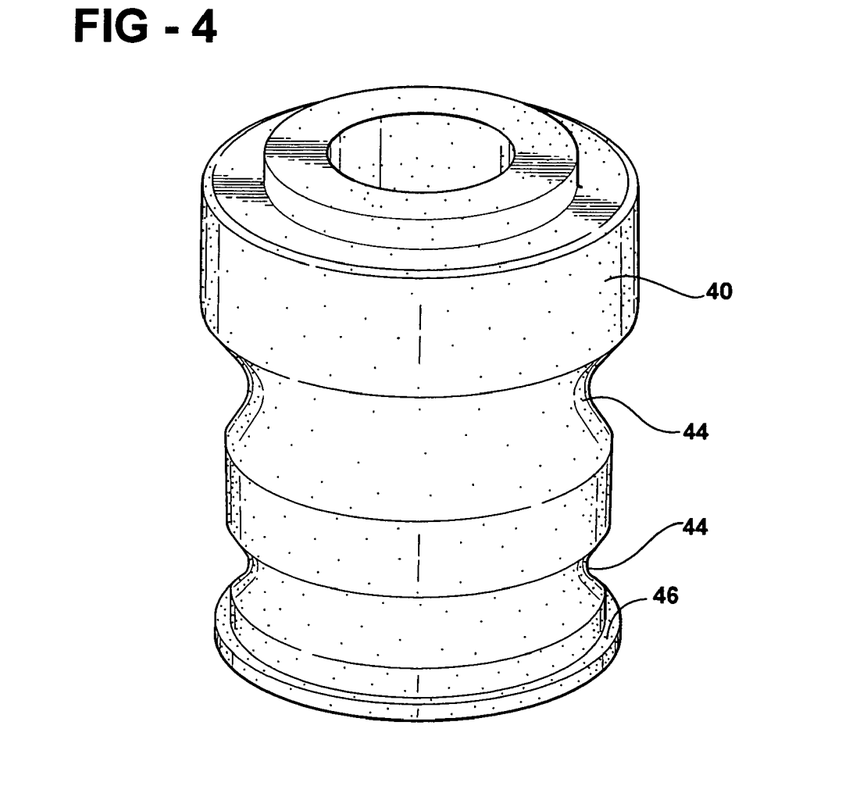
FIG. 4 is a perspective view of a jounce bumper of the subject invention.

The jounce bumper 40 is mounted to the support 26 and extends outwardly toward the striker surface 30, which in this embodiment is the striker plate 30. The jounce bumper 40 is substantially circular and has a series of grooves 44 forming convolutions in the exterior of the jounce bumper 40. The jounce bumper 40 also includes a mounting ridge 46 disposed at a distal end thereof. Unlike many of the prior art jounce bumpers, the jounce bumper 40 of the subject invention is of a substantially uniform thickness and does not include a tapered distal end. This simplified configuration is easier and less expensive to manufacture, especially when manufactured of a urethane material, such as the micro-cellular polyurethane. It should be appreciated, that the jounce bumper 40 may have any suitable configuration as is desired.

Figure 5:
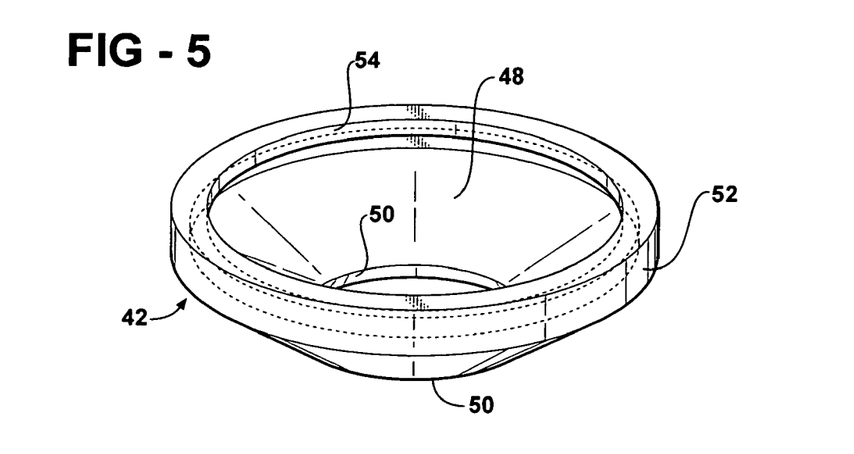
FIG. 5 is a perspective view of a cap of the subject invention.

The cap 42 is mounted to one of the jounce bumper 40 and the striker surface 30. In the embodiment of FIGS. 2 and 3, the cap 42 is mounted to the jounce bumper 40. The cap 42 includes a flange 48 extending to a distal edge 50 for defining a cavity between the distal edge 50 and the jounce bumper 40. The cap 42 includes a base 52 having a diameter that is different than a diameter of the distal edge 50 with the cavity defined between the base 52 and the distal edge 50. The base 52 of the cap 42 could include a mounting flange 54 engaging one of the jounce bumper 40 and the striker plate 30 for mounting the cap 42 to one of the jounce bumper 40 and the striker plate 30. As mentioned above, in this embodiment, the mounting flange 54 of the cap 42 engages the mounting ridge 46 of the jounce bumper 40 for mounting the cap 42 to the jounce bumper 40. The diameter of the distal edge 50 of the cap 42 defines an opening into the cavity with the diameter of the distal edge 50 being smaller than the diameter of the base 52 and a diameter of the mounting flange 54. In the most preferred embodiment, the mounting flange 54 and the distal edge 50 of the cap 42 are substantially annular to define a frustoconical configuration for the cap 42. It should be appreciated that the configuration of the cap 42 could be of any suitable design including, but not limited to, a Belleville washer type configuration.

As mentioned above, the cap 42 is formed of thermoplastic polyurethane. The thermoplastic polyurethane cap 42 can be injection molded which provides great flexibility in design and is relatively inexpensive. Also, the thermoplastic polyurethane cap 42 has greater cut and tear strength than the microcellular polyurethane jounce bumper 40, which provides greater protection against failure of the jounce assembly 38 thereby reducing the likelihood of metal-to-metal contact.

Figure 6:
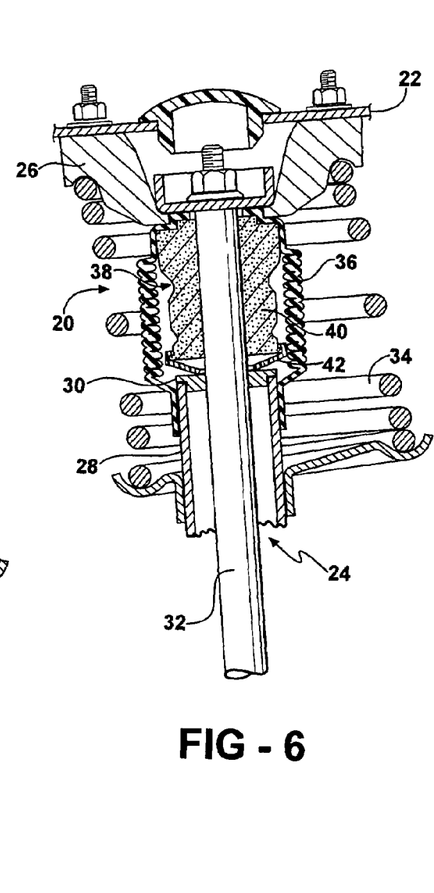
FIG. 6 is a partially cross-sectional front view of the suspension system of the subject invention in a partially compressed state.
Figure 7:
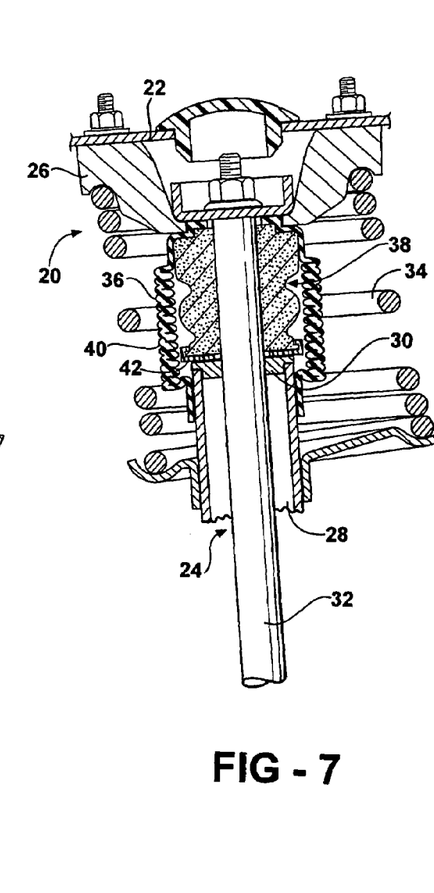
FIG. 7 is a partially cross-sectional front view of the suspension system of the subject invention in a further compressed state.

As best shown in FIGS. 6 and 7, during operation of the suspension system 20, the distal edge 50 of the flange 48 deflects into the cavity when the cap 42 engages one of the striker plate 30 and the jounce bumper 40 during a predetermined displacement of the striker plate 30 relative to the support 26. In the embodiment of FIGS. 2-3 and 6-7, the distal edge 50 of the flange 48 deflects into the cavity when the cap 42 engages the striker plate 30 during a predetermined displacement of the striker plate 30 and cylinder 28 relative to the support 26. As shown in FIG. 6, the cap 42 begins to deflect once engaged by the striker plate 30 to provide a first level of isolation. The jounce bumper 40 may also have some level of deflection at this point. The cylinder 28 and striker plate 30 continue to move through the compressive stroke to substantially collapse the cap 42 and cause deflection of the jounce bumper 40. The gradual deflection of the cap 42 and subsequent deflection of the jounce bumper 40 defines a smooth isolation of forces.

Figure 8:
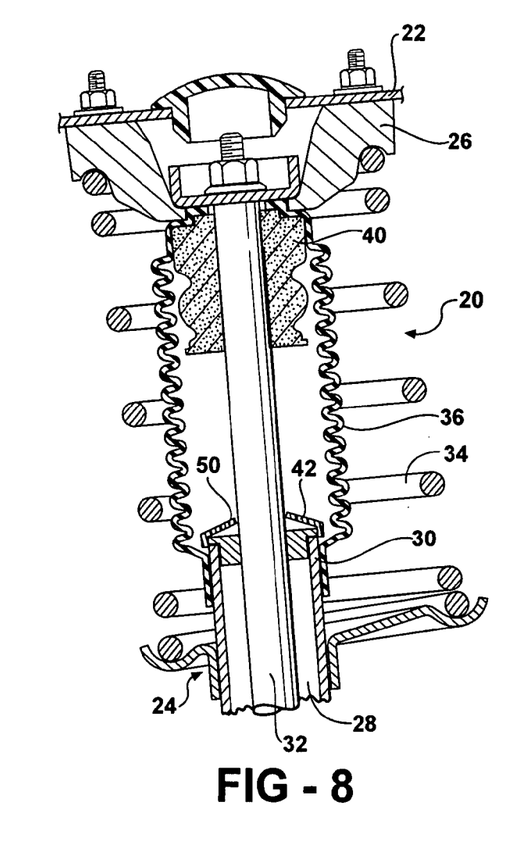
FIG. 8 is a partially cross-sectional front view of an alternative embodiment of the suspension system.

Turning to FIG. 8, an alternative embodiment of the suspension system 20 is shown wherein like numerals indicate like or corresponding parts. The suspension system 20 in FIG. 8 is similar to the suspension system 20 shown in FIGS. 2-3. The primary difference relates to the cap 42 being mounted to the striker surface 30 as opposed to the jounce bumper 40. In particular, the cap 42 is mounted to the striker plate 30 of the cylinder 28. The cavity is therefore defined between the distal edge 50 of the cap 42 and the striker plate 30 whereby the distal edge 50 deflects into the cavity when the cap 42 engages the jounce bumper 40. Hence, during compressive stroke of the cylinder 28, the distal edge 50 of the cap 42 will move into engagement with a distal end of the jounce bumper 40 to provide a first level of isolation. As the cylinder 28 and striker plate 30 continue to move through the compressive stroke, the cap 42 substantially collapses against the jounce bumper 40 and causes deflection of the jounce bumper 40.

Figure 9:
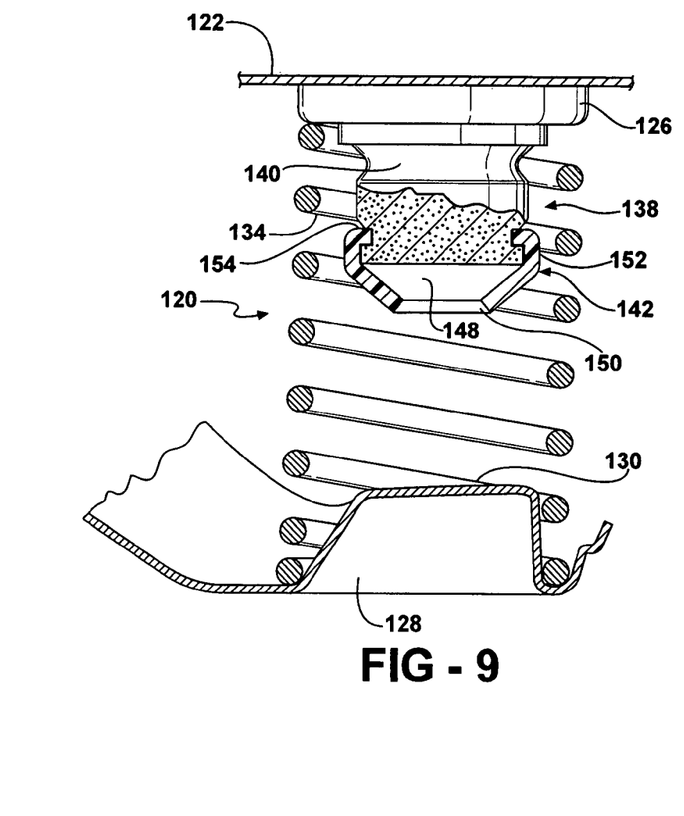
FIG. 9 is a partially cross-sectional front view of another alternative embodiment of the suspension system.

FIG. 9 illustrates another alternative embodiment of the suspension system 20 wherein like numerals increased by 100 indicate like or corresponding parts. This suspension system 120 includes a support 126 mounted to a vehicle body 122 and a movable component 128 displaceable relative to the vehicle body 122 along a line of travel. In this embodiment, the movable component 128 is illustrated as a portion of a vehicle frame 128. A striker surface 130 is associated with the vehicle frame 128. In particular, the striker surface 130 is a substantially flat surface of the vehicle frame 128 opposing the support 126. This type of suspension system 120 includes a coil spring 134 and is also well known to those skilled in the art.

The embodiment of FIG. 9 also includes a jounce assembly 138 mounted to the support 126 and extending outwardly toward the striker surface 130. The jounce assembly 138 is similarly formed of two components, which include the jounce bumper 140 and cap 142. As with the other embodiments, the jounce bumper 140 is formed of an elastomeric material, such as micro-cellular polyurethane and the cap 142 is also formed of an elastomeric material, such as thermoplastic polyurethane. The cap 142 is mounted to the jounce bumper 140 in a similar manner as shown in FIG. 2. The cap 142 also has a similar configuration with a flange 148, a base 152, a mounting flange 154, and an opening within a distal edge 150. During operation of the suspension system 120 of FIG. 9, the distal edge 150 of the flange 148 deflects into the cavity when the cap 142 engages the striker surface 130.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims the invention may be practiced otherwise than as specifically described.

What is claimed is:

1. A suspension system for a vehicle having a vehicle body and a movable component displaceable relative to the vehicle body along a line of travel, said system comprising:
   a support adapted to be mounted to the vehicle body;
   a striker surface adapted to be associated with the movable component and displaceable relative to said support along the line of travel;
   a jounce bumper mounted to said support and extending outwardly toward said striker surface; and
   a cap mounted to one of said jounce bumper and said striker surface with said cap having a flange extending to a distal edge for defining a cavity whereby said distal edge of said flange deflects into said cavity when said cap engages one of said striker surface and said jounce bumper during a predetermined displacement of the striker surface relative to the support.

2. An assembly as set forth in claim 1 wherein said cap includes a base having a diameter that is different than a diameter of said distal edge with said cavity defined between said base and said distal edge.

3. An assembly as set forth in claim 2 wherein said base of said cap includes a mounting flange engaging one of said jounce bumper and said striker surface for mounting said cap to one of said jounce bumper and said striker surface.

4. An assembly as set forth in claim 3 wherein said diameter of said distal edge defines an opening into said cavity with said diameter of said distal edge being smaller than said diameter of said base and a diameter of said mounting flange.

5. An assembly as set forth in claim 4 wherein said mounting flange and said distal edge of said cap are substantially annular to define a frustoconical configuration for said cap.

6. An assembly as set forth in claim 1 wherein said cap and said jounce bumper are formed of elastomeric materials.

7. An assembly as set forth in claim 6 wherein said jounce bumper is formed of micro-cellular polyurethane.

8. An assembly as set forth in claim 7 wherein said cap is formed of thermoplastic polyurethane.

9. An assembly as set forth in claim 1 wherein said cap is mounted to said jounce bumper for defining said cavity between said distal edge of said cap and said jounce bumper whereby said distal edge deflects into said cavity when said cap engages said striker surface.

10. An assembly as set forth in claim 9 wherein said cap includes a mounting flange engaging said jounce bumper for mounting said cap to said jounce bumper.

11. An assembly as set forth in claim 10 wherein jounce bumper includes a mounting ridge disposed at a distal end thereof with said mounting flange of said cap engaging said mounting ridge to secure said cap to said jounce bumper.

12. An assembly as set forth in claim 1 wherein said cap is mounted to said striker surface for defining said cavity between said distal edge of said cap and said striker surface whereby said distal edge deflects into said cavity when said cap engages said jounce bumper.

13. An assembly as set forth in claim 1 further including a piston rod adapted to be mounted to the vehicle body with said jounce bumper, said striker surface, and cap mounted about said rod for defining the line of travel.

14. A suspension system for a vehicle having a vehicle body and a plurality of wheels displaceable relative to the vehicle body, said system comprising:
   a support adapted to be mounted to the vehicle body;
   a piston rod mounted to said support;
   a cylinder adapted to be mounted to each of the wheels with the piston rod extending into said cylinder and said cylinder moving relative to said piston rod and said support along a line of travel;
   a striker plate mounted to said cylinder about said piston rod and displaceable relative to said support during said movement of said cylinder along the line of travel; and
   a jounce assembly mounted to said support about said piston rod and extending outwardly toward said striker plate, said jounce assembly including a jounce bumper and a cap with said cap having a flange extending to a distal edge for defining a cavity between said distal edge and said jounce bumper whereby said distal edge of said flange deflects into said cavity when said cap engages said striker plate during a predetermined displacement of said cylinder relative to said support.

15. An assembly as set forth in claim 14 wherein said jounce assembly is formed of an elastomeric material.

16. An assembly as set forth in claim 15 wherein said jounce bumper is formed of micro-cellular polyurethane and said cap is formed of thermoplastic polyurethane.

17. An assembly as set forth in claim 14 wherein said jounce bumper includes a mounting ridge disposed at a distal end thereof and said cap includes a mounting flange engaging said mounting ridge to secure said cap to said jounce bumper.

18. A jounce assembly for use in a suspension system having a support and a movable component displaceable relative to the support along a line of travel with a striker surface mounted to the movable component and displaceable relative to said support along the line of travel, said assembly comprising:
   a jounce bumper adapted to be mounted to the support and extending outwardly toward the striker surface; and
   a cap mounted to said jounce bumper with said cap having a flange extending to a distal edge for defining a cavity between said distal edge and said jounce bumper whereby said distal edge of said flange deflects into said cavity when said cap engages the striker surface during a predetermined displacement of the striker surface relative to the support.

19. An assembly as set forth in claim 18 wherein said cap and said jounce bumper are formed of elastomeric materials.

20. An assembly as set forth in claim 19 wherein said jounce bumper is formed of micro-cellular polyurethane and said cap is formed of thermoplastic polyurethane.

21. An assembly as set forth in claim 18 wherein jounce bumper includes a mounting ridge disposed at a distal end thereof and said cap includes a mounting flange engaging said mounting ridge to secure said cap to said jounce bumper.

22. An assembly as set forth in claim 21 wherein said mounting flange of said cap defines a base having a diameter that is wider than a diameter of said distal edge with said cavity defined between said base and said distal edge.

23. An assembly as set forth in claim 22 wherein said diameter of said distal edge defines an opening into said cavity with said diameter of said distal edge being smaller than said diameter of said base and a diameter of said mounting flange.

24. An assembly as set forth in claim 23 wherein said mounting flange and said distal edge of said cap are substantially annular to define a frustoconical configuration for said cap.

* * * * *